United States Patent
Rosenblatt

(10) Patent No.: US 8,294,659 B2
(45) Date of Patent: Oct. 23, 2012

(54) SECONDARY BACKLIGHT INDICATOR FOR PORTABLE MEDIA DEVICES

(75) Inventor: Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 904 days.

(21) Appl. No.: 11/804,427

(22) Filed: May 18, 2007

(65) Prior Publication Data

US 2008/0284696 A1 Nov. 20, 2008

(51) Int. Cl.
*G09G 3/36* (2006.01)

(52) U.S. Cl. ......... 345/102; 345/87; 362/97.2; 362/628

(58) Field of Classification Search .................. 345/102
See application file for complete search history.

(56) References Cited

U.S. PATENT DOCUMENTS

| | | | | |
|---|---|---|---|---|
| 1,662,348 A | * | 3/1928 | Stricker | 40/573 |
| 4,653,094 A | * | 3/1987 | Rasmussen et al. | 379/396 |
| 5,143,433 A | * | 9/1992 | Farrell | 345/102 |
| 5,332,946 A | * | 7/1994 | Eckersley et al. | 313/506 |
| 5,406,268 A | * | 4/1995 | Fullmer | 340/815.42 |
| 5,796,382 A | * | 8/1998 | Beeteson | 345/102 |
| 5,987,793 A | * | 11/1999 | Ebine | 40/580 |
| 6,160,495 A | * | 12/2000 | Demink et al. | 340/944 |
| 6,496,236 B1 | * | 12/2002 | Cole et al. | 345/102 |
| 6,725,064 B1 | * | 4/2004 | Wakamatsu et al. | 345/102 |
| 6,825,828 B2 | * | 11/2004 | Burke et al. | 345/102 |
| 6,842,170 B1 | * | 1/2005 | Akins et al. | 345/173 |
| 7,432,463 B2 | * | 10/2008 | Clegg et al. | 200/310 |
| 7,616,097 B1 | * | 11/2009 | Whang | 340/321 |
| 7,959,340 B2 | * | 6/2011 | Kofidis et al. | 362/603 |
| 2002/0021276 A1 | * | 2/2002 | Park | 345/102 |
| 2003/0006290 A1 | * | 1/2003 | Hussey et al. | 235/472.01 |
| 2003/0073467 A1 | * | 4/2003 | Tanaka et al. | 455/567 |
| 2003/0107497 A1 | * | 6/2003 | Krenz et al. | 340/815.4 |
| 2003/0226494 A1 | * | 12/2003 | Sunaga et al. | 116/28 R |
| 2004/0171410 A1 | * | 9/2004 | Deeds | 455/575.1 |
| 2005/0086366 A1 | * | 4/2005 | Luebke et al. | 709/238 |
| 2007/0024772 A1 | * | 2/2007 | Childers et al. | 349/68 |
| 2007/0058390 A1 | * | 3/2007 | Sugawara et al. | 362/560 |
| 2007/0279368 A1 | * | 12/2007 | Shefter | 345/102 |
| 2009/0284481 A1 | * | 11/2009 | Zhuang et al. | 345/102 |

FOREIGN PATENT DOCUMENTS

| | | | |
|---|---|---|---|
| DE | 19545700 A1 | * | 6/1997 |
| GB | 2410116 A | * | 7/2005 |

\* cited by examiner

*Primary Examiner* — William Boddie
*Assistant Examiner* — Dorothy Harris
(74) *Attorney, Agent, or Firm* — Fletcher Yoder PC

(57) ABSTRACT

Systems and methods are provided for displaying icons directly on a display, such as an LCD, regardless of whether the display is ON. When the display is ON, a primary backlight may be used to illuminate the display. When the display is OFF, a secondary backlight may project light through the primary backlight to display one or more icons on the display. The displayed icons may be of various shapes, colors, and sizes.

41 Claims, 14 Drawing Sheets

SECONDARY BACKLIGHT INDICATOR FOR PORTABLE MEDIA DEVICES

BACKGROUND OF THE INVENTION

This invention relates to electronic devices and more particularly to providing display indicators for electronic devices.

Portable electronic devices such as digital electronic devices (e.g., music players and video players) are known. These devices are typically powered by one or more batteries. Batteries store a fixed amount of energy. Therefore, efficient use of the fixed energy source is desirable in order to maximize the length of time between battery replacements or recharges.

One way to conserve energy is to turn off a display (e.g., LCD) of a portable electronic device when the user does not need or want to view media. For example, the display of a music player may be turned off after the user is done choosing music to play. However, if the display of an electronic device is turned off, it may be difficult or impossible for a user to determine the status of the device, or to identify that the electronic device itself is still on. Thus, it is desirable to provide one or more low-power consuming indicators to inform the user of the status of the device.

Known indicators, however, are provided through a hole in the casing of an electronic device, where a low-power light may be generated to show through the hole. However, this approach requires extra assembly or packaging considerations that may be expensive and may detract from the aesthetic appeal of the device. Therefore, there is a need for electronic devices that provide indicators directly on the display.

SUMMARY OF THE INVENTION

Systems and methods are provided for displaying information on the display of an electronic device, such as a portable electronic device.

The display system of an electronic device can include a display (e.g., an LCD), a primary backlight system, and a secondary backlight system. Each of these components may be ON or OFF. When the display is ON, it can provide media, such as video clips or graphics. When the primary or secondary backlight systems are ON, they may generate light to illuminate the display.

The display system may have multiple operating modes. The display system may be in a first operating mode when a user wants to view media on the display. In this mode, the display may be turned ON to display the desired media. The primary backlight system may also be turned ON to allow the user to easily see the contents of the display. Alternatively, the primary backlight system may remain OFF, and the user may rely on external lighting to view the contents of the display. The display system may enter a second, less power consuming mode when a user does not want to view media. In this mode, the display may be turned OFF. Also, because no content is available for the user to view, the primary backlight system may also be turned OFF.

In the second operating mode, even though the display is OFF, information such as a status indicator can be provided on the display. To provide an icon on the display of the electronic device that is indicative of the status of the device, the secondary backlight system may be turned ON. The secondary backlight system may be separated from the display by the primary backlight system. Thus, the light provided by the secondary backlight system may be projected through one or more transparent or semitransparent regions of the primary backlight system to reach the display. The primary backlight system may block light from the secondary backlight system except for those one or more regions. Thus, the size and shape of the status indicator may be set by sizing and shaping the transparent or semitransparent regions of the primary backlight system. In addition to setting the size and shape of the icon, the color of the icon may also be set by adjusting the color of the light provided by the secondary backlight system.

In accordance with another aspect of the present invention, a display system may provide multiple status indicator icons or information displays of any suitable size, shape, and color, and may selectively choose between them. In some embodiments, the icons may be displayed at different locations on the display. In these embodiments, each icon may correspond to a separate transparent or semitransparent region of the primary backlight system. Thus, during operation, the secondary backlight system may selectively guide light toward certain regions of the primary backlight such that only selected icons are shown on the display. To ensure that the light from the secondary backlight system only reaches the proper region or regions on the primary backlight system and does not leak to other regions, the display system may additionally include one or more color filter layers between the primary and secondary backlight systems. Each color filter layer may include color filters that may only transmit certain colors and may block other colors. Thus, if each icon is associated with a different color, the color filters may ensure that colored light guided from the secondary backlight system toward a particular transparent or semitransparent region of the primary backlight system does not leak through another region.

In some embodiments, multiple status indicator icons may be displayed at substantially the same location on the display. To vary the shape or size of each indicator, the shape and size of the color filters may be varied rather than the shape and size of the transparent or semitransparent regions of the primary backlight system. For example, color filters of different shapes and with different properties may be superimposed on each other. Thus, the shape of an icon on the display may depend on the color of light provided by the secondary backlight. This technique may also be used for icons that are displayed side-by-side.

In accordance with another aspect of the present invention, the one or more displayed icons may be dynamic. For example, a light source within the secondary backlight system may be turned ON and OFF to create a blinking effect, or the intensity of the light may be varied through, for example, pulse-width-modulation. Also, the one or more icons may be displayed in short time intervals (e.g., for half a second every five seconds) in order to conserve battery power.

Therefore, each status indicator provided by the electronic device, whether located at different locations on a display or at substantially the same location, may be associated with light having particular properties. For example, each indicator may have a particular color, blinking speed, or light intensity. These properties may be programmed into the electronic device by the user, or may be hard-coded or hard-wired into the system. Thus, when the secondary backlight is turned ON (e.g., when switching to the second operating mode as discussed above), the properties of the light provided by the secondary backlight system may depend on the status of the device. Also, if the status of the electronic device changes while the secondary backlight is ON, the properties of the light provided by the secondary backlight system may change to reflect the new status.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which:

FIG. 7-10A show display systems with multiple indicators and multiple color filters in accordance with some embodiments of the present invention;

DETAILED DESCRIPTION OF THE INVENTION

Figure 1:
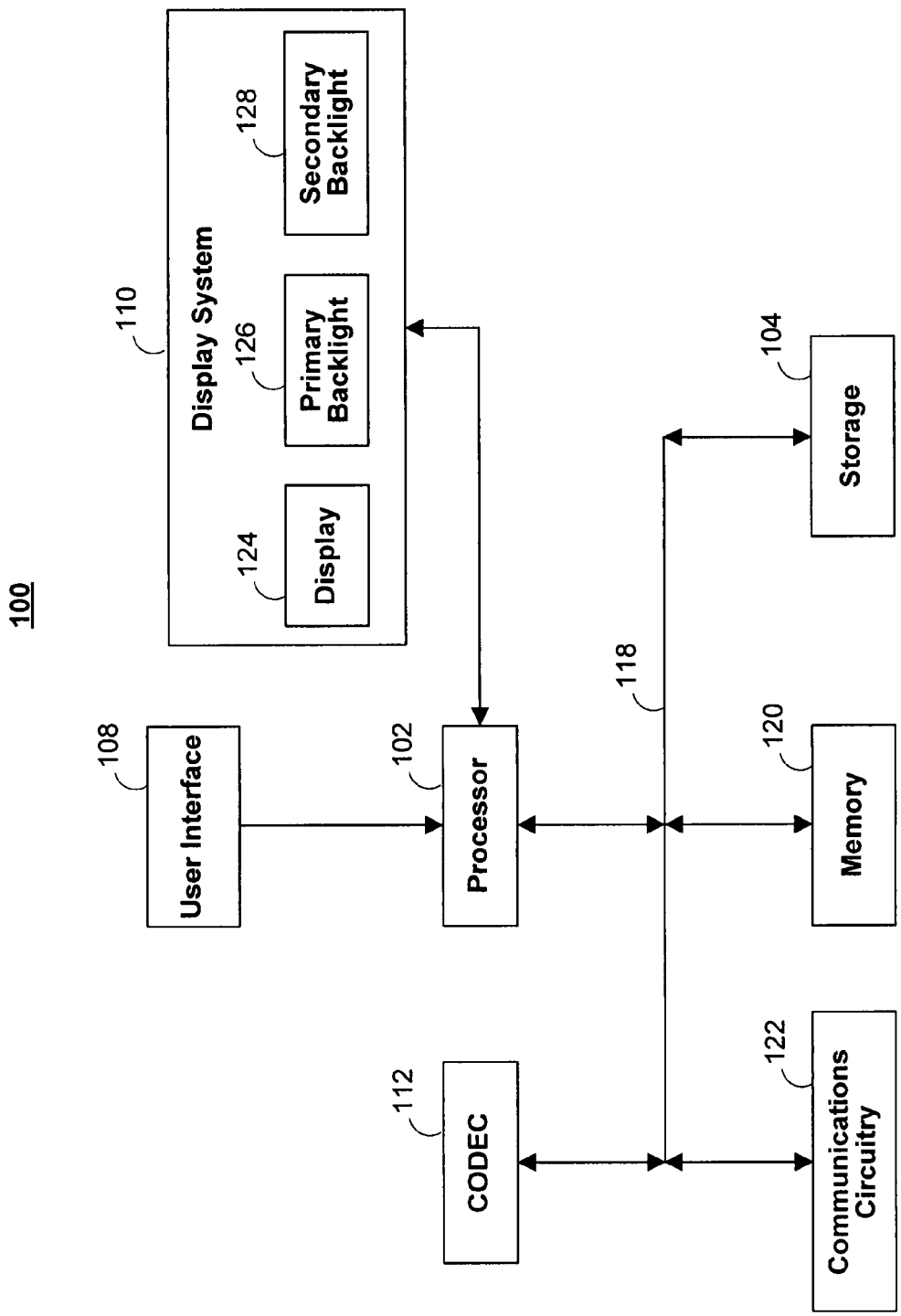
FIG. 1 shows a block diagram of an electronic device in accordance with an embodiment of the present invention.

FIG. 1 shows a simplified block diagram of illustrative electronic device 100. Electronic device 100 may include processor 102, storage device 104, user interface 108, display system 110, CODEC 112, bus 118, memory 120, and communications circuitry 122. Processor 102 can control the operation of many functions and other circuitry included in electronic device 100. Processor 102 may drive display 110 and may receive user inputs from user interface 108.

Storage device 104 may store media (e.g., music and video files), software (e.g., for implementing functions on device 100), preference information (e.g., media playback preferences, backlight preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection such as a telephone connection), subscription information (e.g., information that keeps track of podcasts or television shows or other media a user subscribes to), telephone information (e.g., telephone numbers), and any other suitable data. Storage device 104 may include one or more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory may be provided for storing firmware for device applications (e.g., operating system, user interface functions, and processor functions).

Bus 118 may provide a data transfer path for transferring data to, from, or between storage device 104, communications circuitry 122, memory 120, and processor 102. Coder/decoder (CODEC) 112 may be included to convert digital audio signals into an analog signal, which may be provided to an output port (not shown).

User interface 108 may allow a user to interact with device 100. For example, user input device 108 can take a variety of forms, such as a button, keypad, dial, click wheel, or touch screen. Communications circuitry 122 may include circuitry for wireless communication (e.g., short-range and/or long-range communication). For example, the wireless communication circuitry may be wi-fi enabling circuitry that permits wireless communication according to one of the 802.11 standards or a private network. Other wireless network protocol standards could also be used, either as an alternative to the identified protocols or in addition to the identified protocols. Another network standard may be Bluetooth.

Display system 110 may present media, including graphics, text, and video, to a user. Display system 110 can include display 124, which may be a liquid crystal display (LCD), a touch screen display, or any other suitable display for displaying media. Display system 110 can also include primary backlight system 126 and secondary backlight system 128 to illuminate display 124. Backlight systems 126 and 128 may each include one or more light-emitting diodes (LEDs), light bulbs, or any other suitable light sources. Backlight systems 126 and 128 may each also include other components for transporting or guiding light provided by the one or more light sources. For convenience, these and other backlight systems will be referred to simply as "backlights," but should not be confused with the light sources that can be included in the backlight.

Display 124, primary backlight 126, and secondary backlight 128 may each be driven by processor 102, by processing circuitry internal to display system 110 (not shown), or by a combination of the two. These processors may process the media displayed by display 124. Also, the processors may selectively turn each of display 124, primary backlight 126, and secondary backlight 128ON or OFF. Display 124 may only display media when it is ON. Primary backlight 126 and secondary backlight 128 may only provide light when they are ON.

In one embodiment, device 100 may be a portable computing device dedicated to processing media, such as audio and video media. For example, device 100 may be an electronic device (e.g., MP3 player), a game player, a remote controller, a portable communication device, a remote ordering interface, an audio tour player, or other suitable personal device.

In another embodiment, device 100 may be a portable device dedicated to media processing and telephone functionality in a single integrated unit. Device 100 may be battery-operated and highly portable so as to allow a user to listen to music, play games or video, record video or take pictures, place and take telephone calls, communicate with others, control other devices, and any combination thereof. In addition, device 100 may be sized such that it fits relatively easily into a pocket or hand of the user. By being handheld, device 100 may be relatively small and easily handled and utilized by its user, and thus may be taken practically anywhere the user travels.

Figure 2A:
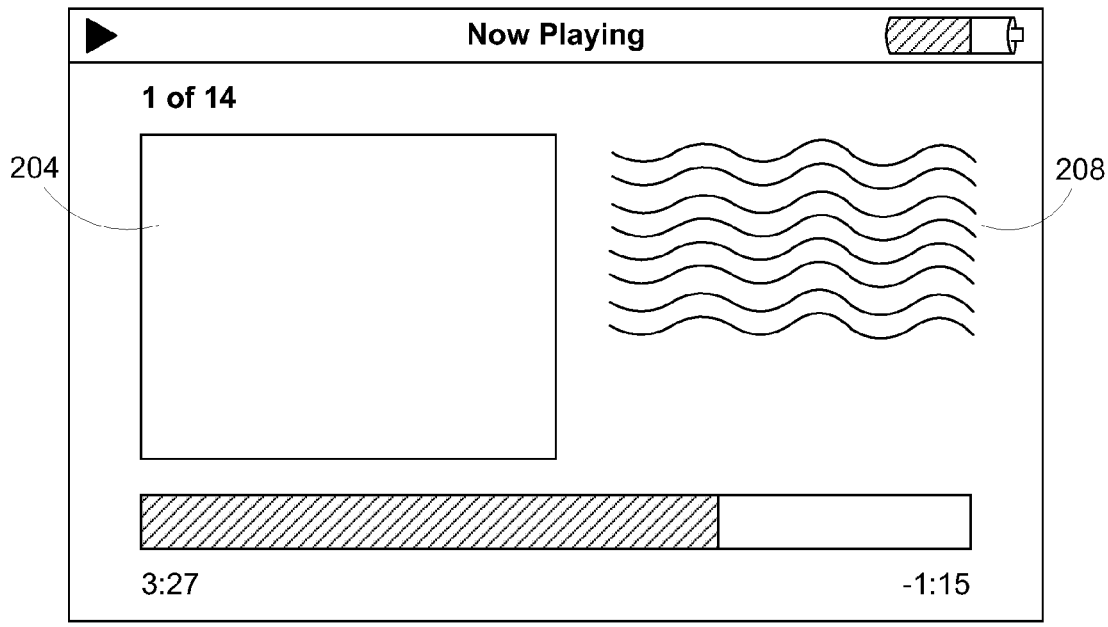
FIGS. 2A and 2B show illustrative display screens in accordance with an embodiment of the present invention.
Figure 2B:
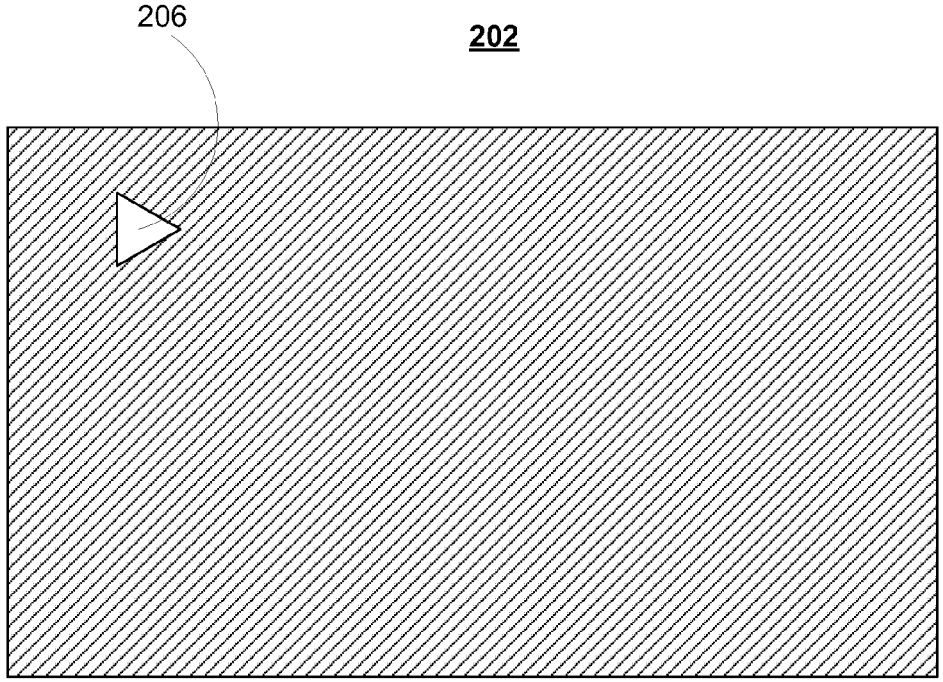

FIGS. 2A and 2B show illustrative display screens 200 and 202 that may be provided by a display system, such as display system 110 (FIG. 1), of an electronic device. Display screen 200 of FIG. 2A may be provided when a user wants to view media. In particular, the contents of display screen 200 may be provided by a display (e.g., display 124) of the display system. The content provided by the display may include information about media that is playing. For example, if the electronic device is a music player, display screen 200 may include information related to a song that the electronic device is playing. The information may include text 208 (e.g., the title of the song, the name of the artist and/or album), graphics 204 (e.g., the cover of the album, picture of the artist), and any other suitable information. Display screen 200 may also include actual media, rather than just information, such as a video clip or a music video. In addition, display screen 200 may be illuminated by a backlight (e.g., primary backlight 126) to allow a user to view the media or media information on display screen 200 regardless of the external lighting conditions. Alternatively, the backlight may be turned OFF to conserve power in the electronic device, and the user may rely on external light to view the display.

Display screen 202 of FIG. 2B may be provided by the electronic device when the user does not want to view media or the device detects a situation where the user cannot view the content even if it is being displayed, such as when the device is in the user's pocket or bag. In FIG. 2B, the display (e.g., display 124) is turned OFF. Display screen 202 may include icon/indicator 206 to indicate the status of the device. Indicator 206 may be a green light projected onto a portion of the display, and may be triangularly shaped, a shape often used as a "play" icon, to indicate that media is currently playing. It should be understood that indicator 206 may be of any suitable shape, size, and color, and may be used for any suitable reason. Furthermore, although only one indicator is shown on display screen 202, there may be more than one indicator on the display. To conserve power, the remaining portions of display screen 202 may appear substantially the same as when the electronic device is OFF. That is, a backlight typically used to illuminate a substantial portion of the display (e.g., primary backlight 126) may be turned OFF whenever display screen 202 is provided.

Figure 3A:
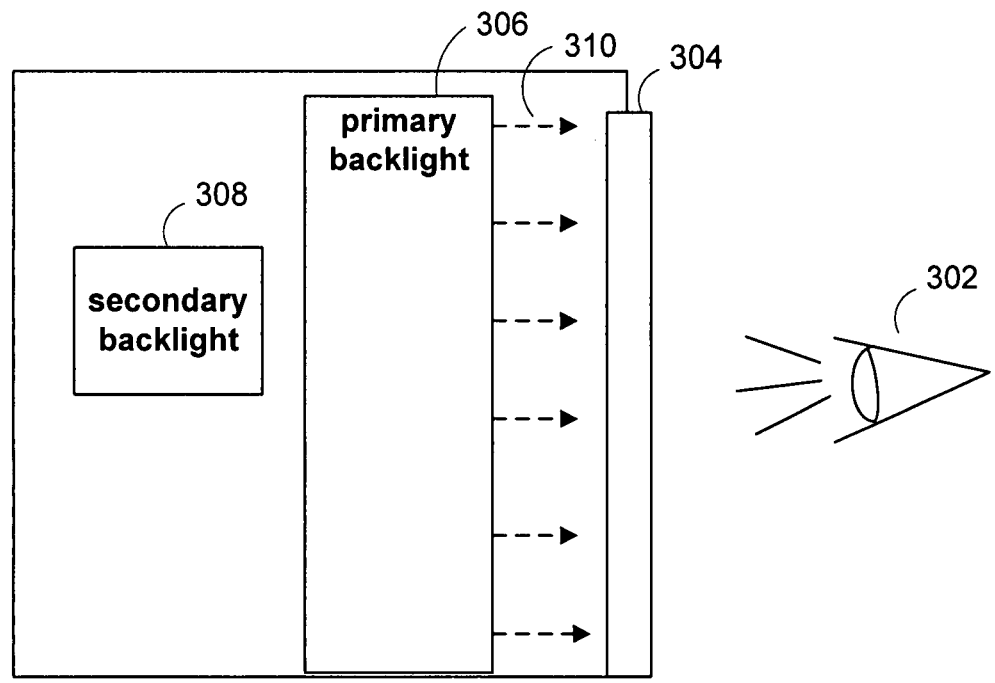
FIGS. 3A and 3B show an illustrative block diagram of a display system in accordance with an embodiment of the present invention.
Figure 3B:
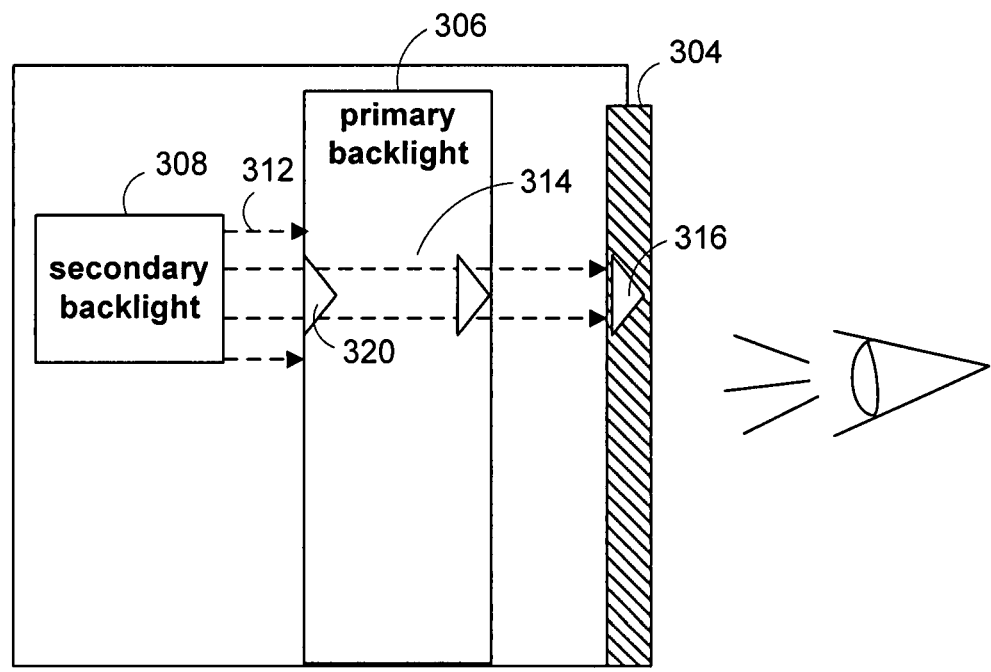

FIGS. 3A and 3B show a high level block diagram of a display system in accordance with embodiments of the present invention. FIGS. 3A and 3B show the display system operating in two different modes, where FIG. 3A shows a mode able to provide display screen 200 (FIG. 2A), and FIG. 3B shows a mode able to provide display screen 202 (FIG. 2B). For simplicity, when the display system is operating as shown in FIG. 3A, the display system may be referred to as ON—that is at least the display is turned ON. When the display system is operating as shown in FIG. 3B, the display system may be referred to as OFF—that is at least the display is turned OFF.

The display system may include display 304 (e.g., display 124), primary backlight 306 (e.g., primary backlight 126), and secondary backlight 308 (e.g., secondary backlight 128). For clarity, eye 302 shows a point of view from which a viewer can view the display system. In FIG. 3A, display system 304 and primary backlight 306 are ON, while secondary backlight 308 is OFF. Therefore, display 304 may provide media and media information, such as display screen 200 of FIG. 2A, to a viewer. To illuminate the display, primary backlight 306 may project light 310 toward display 304. Primary backlight 306 may provide light 310 such that the intensity of the light is distributed substantially evenly across display 304. In other embodiments, primary backlight 306 may be OFF and does not provide light 310. In these embodiments, content provided by display 304 may be viewable even though primary backlight 306 is OFF.

FIG. 3B shows a display system operating to provide a display screen similar to display screen 202 in FIG. 2B. In FIG. 3B, display 304 is OFF, and does not provide content to a viewer. Primary backlight 306 is also OFF, and does not illuminate display 304. Secondary backlight 308 is ON, and can generate light 312, which can be projected toward primary backlight 306. Primary backlight 306 may allow a portion of light 312 to pass through to display 304. In particular, primary backlight 306 may include region 320 that permits light to pass through, and may block all other light provided from secondary backlight 308. Region 320 may be shaped and sized in any suitable way to permit light of any suitable shape and size to pass through. For example, region 320 may be triangularly shaped. In this way, light 314 that is permitted to travel through the primary backlight may create a triangular "play" indicator, icon 316, on display 304. The remaining areas of display 304 may remain dark, since no light from the secondary backlight may reach those areas.

Figure 4A:
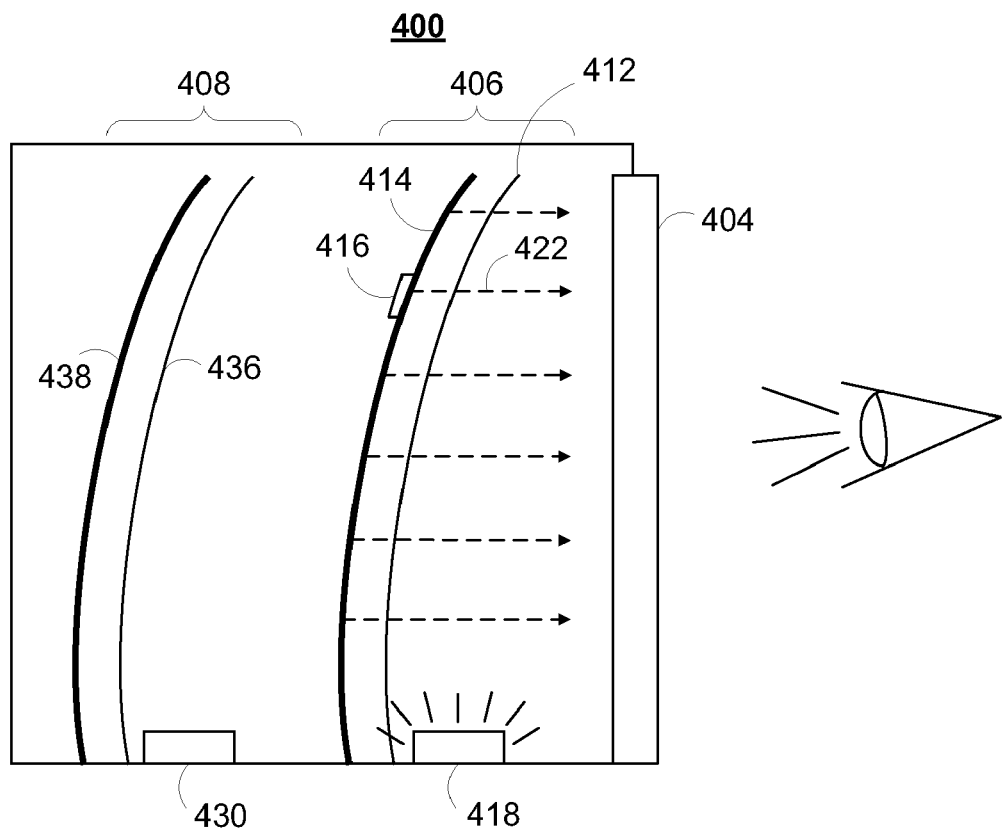
FIGS. 4A and 4B show more detailed, yet still simplified, diagrams of a display system similar to the display system of FIG. 3, but from a side perspective, in accordance with an embodiment of the present invention.
Figure 4B:
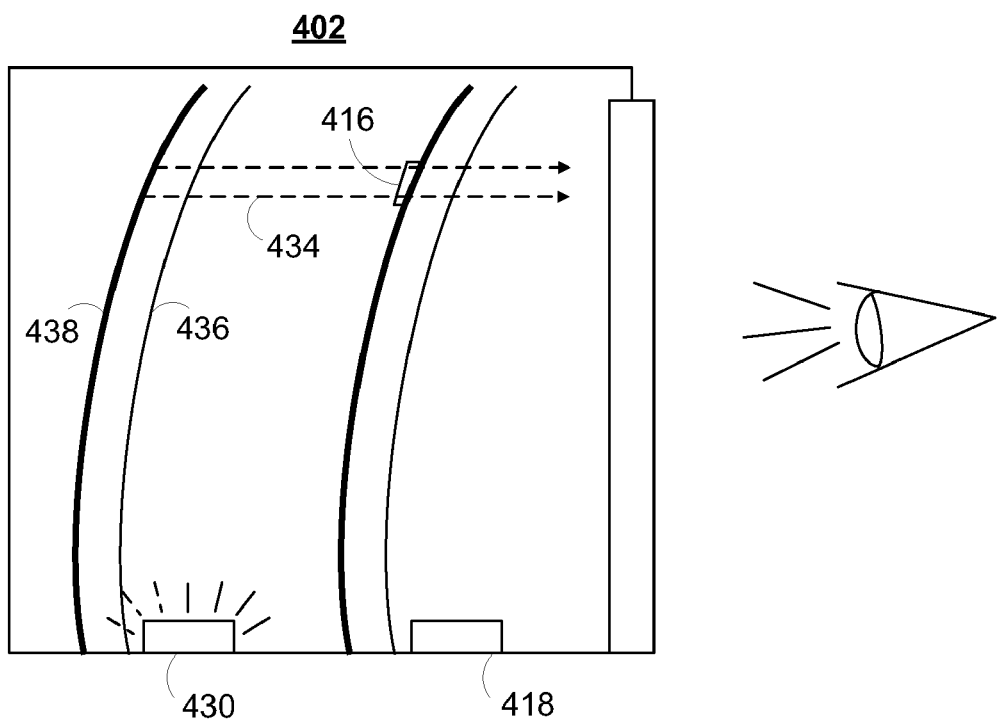

FIGS. 4A and 4B show a detailed embodiment of FIGS. 3A and 3B, respectively. Primary backlight 406 can include light source 418, light pipe 412, and reflective layer 414. Secondary backlight 408 can include light source 430, light pipe 436, and reflective layer 438.

Referring first to primary backlight 406, light source 418 can include one or more LEDs or light bulbs, or any combination of suitable sources capable of generating light. Block diagram 400 in FIG. 4A shows primary backlight 406 in an ON state with light source 418 generating light. Block diagram 402 in FIG. 4B shows primary backlight 406 in an OFF state. Similarly, block diagram 400 shows secondary backlight 408 in an OFF state, while block diagram 402 shows secondary backlight 408 in an ON state.

Primary backlight 406 (FIGS. 4A and 4B) can also include light pipe 412 to transport light along the length and width of display 404. Light pipe 412 may ensure that light 422 emitted from light source 418 is evenly distributed across display 404 even though the light source is located near the bottom of display 404. To effectively transport light, light pipe 412 may include one or more layers of any suitable materials. In addition, light pipe 412 may have any suitable contour and may be of any suitable thickness. Furthermore, the contour and thickness may vary at different portions of light pipe 412.

Reflective layer 414 may reflect light generated by light source 418 toward display 404. To efficiently utilize the light from light source 418, reflective layer 414 may reflect a substantial proportion of the light from light source 418 that would otherwise have traveled away from display 404. Reflective layer 414 may also block a substantial proportion of light generated by secondary backlight 408. Reflective layer 414 may substantially block light projected from light source 430 except for any light traveling toward a semitransparent region of the layer, region 416. Thus, for light traveling from secondary backlight 408, reflective layer 414 may be considerably more transitive at region 416 than its remaining portions. Therefore, in some embodiments, region 416 may transmit light in one direction considerably more easily than the other, namely from secondary backlight 408 to display 404, but not as well in the other direction. This is shown in FIGS. 4A and 4B, where light 422 from the primary light source 418 is substantially reflected, while light 434 from the secondary backlight 408 is substantially transmitted. In other embodiments, region 416 may allow light to travel more equally in both directions. If the size of region 416 is small compared to the total size of the reflective layer, the loss of reflected light from the non-reflective portion may have little or no effect.

Semitransparent region 416 may be created in any suitable way. In some embodiments, semitransparent region 416 may be etched into the reflective layer, and, if necessary, light pipe 412. In other embodiments, region 416 may be made using a different material than the remainder of reflective layer 414.

Secondary backlight 408 can include light source 430, light pipe 436, and reflective layer 438. Light source 430 may be one or more of any suitable light-emitting devices, such as one or more LEDs. In some embodiments, because secondary backlight 408 may be used to project light onto a portion of display 404 rather than the entire display, less light may be generated by light source 430 than light source 418. Thus, light source 430 may include fewer lighting-emitting devices than light source 418, may use dimmer and less power-consuming devices, or may utilize any other technique for generating a suitable amount of light.

Secondary light pipe 436 can transport light emitted from light source 430 along the pipe. Light pipe 436 may need to transfer light to the portion of the light pipe directly behind the semitransparent region of primary reflective layer 414, where light may be transmitted through semitransparent region 416 and onto display 404. In some embodiments, light pipe 436 may be shaped or designed to effectively transport light to the areas of the light pipe where light may eventually reach the display. If desired, light pipe 436 may be sized to only span the distance from light source 430 to semitransparent portion 416. In other embodiments, light pipe 436 may transport light such that it is spread substantially evenly across a substantial portion of primary reflective layer 414. These embodiments may be used if the location of region 416 is unknown or may vary between different display systems.

Reflective layer 438 of secondary backlight 408 directs light transported by light pipe 436 through portion 416 of the primary reflective layer. That is, it reflects light toward display 304. Because only a portion of display 404 is lighted by the secondary backlight, in some embodiments, only the area of reflective layer 438 directly behind portion 416 may be reflective. The remainder of layer 438 may be non-reflective or may not be present at all.

Figure 5A:
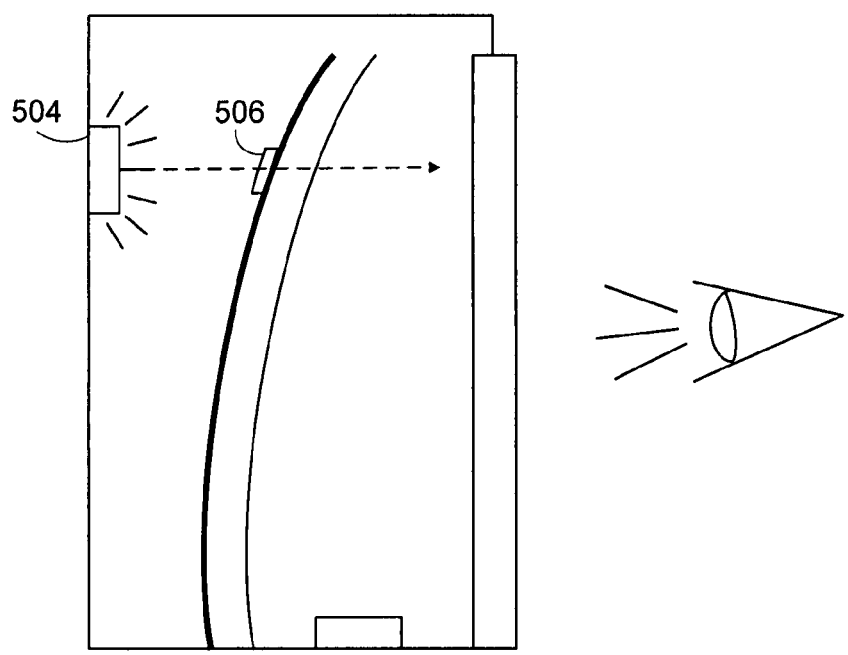
FIGS. 5A and 5B show more detailed, yet still simplified, diagrams of a display system similar to the display system of FIG. 3, but from a side perspective, in accordance with an embodiment of the present invention.
Figure 5B:
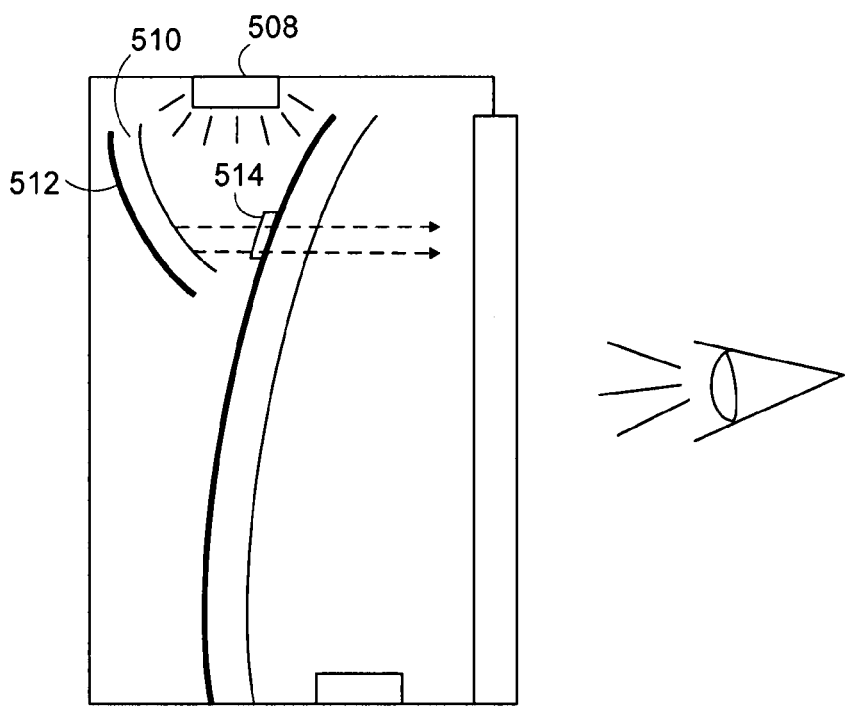

FIGS. 4A and 4B show one way that the block diagrams of FIGS. 3A and 3B may be implemented. FIGS. 5A and 5B show alternate ways to implement the secondary backlight. In particular, FIGS. 4A and 4B show the secondary light sources situated at other suitable locations behind the primary backlight. In FIG. 5A, light source 504 is situated directly behind the semitransparent region 506 of the primary backlight. In this embodiment, the secondary backlight can include only light source 504, because light source 504 may efficiently transmit light through portion 506 by itself. Alternatively, the secondary backlight may additionally include a light pipe and a reflective layer.

The secondary light source may be located at a predetermined position (e.g., near the top of the display system, as shown in FIG. 5B). The secondary backlight may include light pipe 510 and reflective layer 512, which may have one or more of the properties discussed above. The shape and other properties of light pipe 510 and reflective layer 512 may be selected such that light provided by light source 508 may be efficiently transmitted through region 514 of the primary backlight. Thus, secondary light source may be located at any suitable position. Although not shown, the primary light source may also be located at any suitable position, and not just near the bottom of the display.

Figure 6:
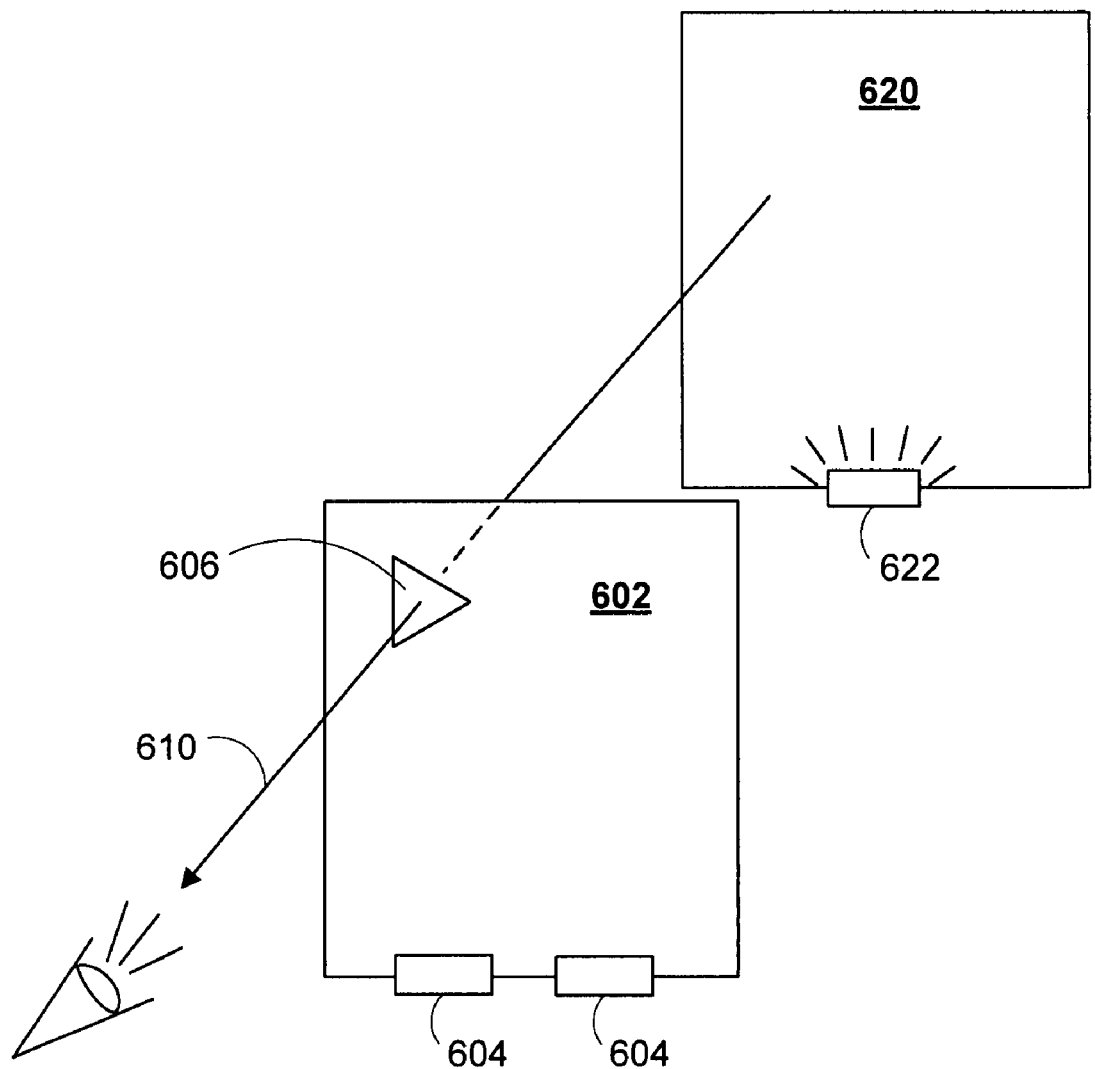
FIG. 6 shows a perspective view of a display system similar to FIGS. 4A and 4B in accordance with an embodiment of the present invention.

FIG. 6 shows an exploded view of a portion of a display system similar to that of FIG. 4B, but from a different perspective. The display system is oriented such that the light pipe and reflective layer are viewable approximately head on. For convenience, the light pipe and reflective layers are shown as a single layer. Thus, the primary backlight can include light sources 604 and primary layer 602, where the primary layer may include both a light pipe and a reflective layer. The secondary backlight may include light source 622 and secondary layer 620, where layer 620 may also include a light pipe and a reflective layer. The primary backlight is shown to be OFF, while the secondary backlight is shown to be ON. Thus, light source 622 of the secondary backlight can generate light and project it toward the primary layer. Of this light, only light 610 traveling through semitransparent region 606 may pass through the primary layer and reach the display. The remaining portions of primary layer 602 may block light projected from the secondary backlight.

The display system in FIG. 6 may be used to display an icon on a display (not shown) of any suitable size and shape. The shape of the icon may be tailored for graphic association. For example, the icon may be triangular, a shape that typically represents "play," or the icon may be circular, a shape that is typically associated with "record." Thus, the shape of an icon may be used to represent the meaning of the icon. The icon may be shaped and sized by shaping and sizing semitransparent region 606 of the primary layer. That is, light 610 projected onto the display map can be shaped according to the light allowed through the primary layer.

An icon displayed on the display in FIG. 6 (not shown) may also be of any suitable color. A colored icon may be used for color association. For example, green, which is typically associated with "go," may be used for a "play" icon, while red, typically associated with "stop," may be used for a "pause" icon (not shown). Thus, the color of an icon, in addition to or instead of the shape of the icon, may be used to represent the meaning of the icon. To create a colored icon, secondary light source 622 may emit light of any suitable color. For example, light source 622 may include a green LED for a "play" icon, or light source 622 may include a red LED for a "pause" icon.

The position of the components in FIG. 6 is merely illustrative. It should be understood that the position of light source 622 may be adjusted vertically, similar to the manner in which the secondary light source of FIGS. 5A and 5B can be adjusted as discussed above. In addition to adjusting the vertical position of light source 622 in FIG. 6, the horizontal position may also be adjusted. For example, rather than being positioned at the center of layer 620, light source 622 may be placed at the same horizontal location as portion 606 (e.g., towards the left of the layer). Similarly, light sources 604 of the primary backlight may be arranged at any suitable horizontal or vertical location in front of the primary backlight layer. Layers 602 and 620 may also be of any suitable size. Primary layer 602 can be substantially the same size as the display, so that light may be transported and reflected to all parts of the display. In some embodiments, secondary layer 620 may be smaller than primary layer 602. For example, secondary backlight layer 620 may be substantially the same width as the width of semitransparent portion 606.

Figure 7:
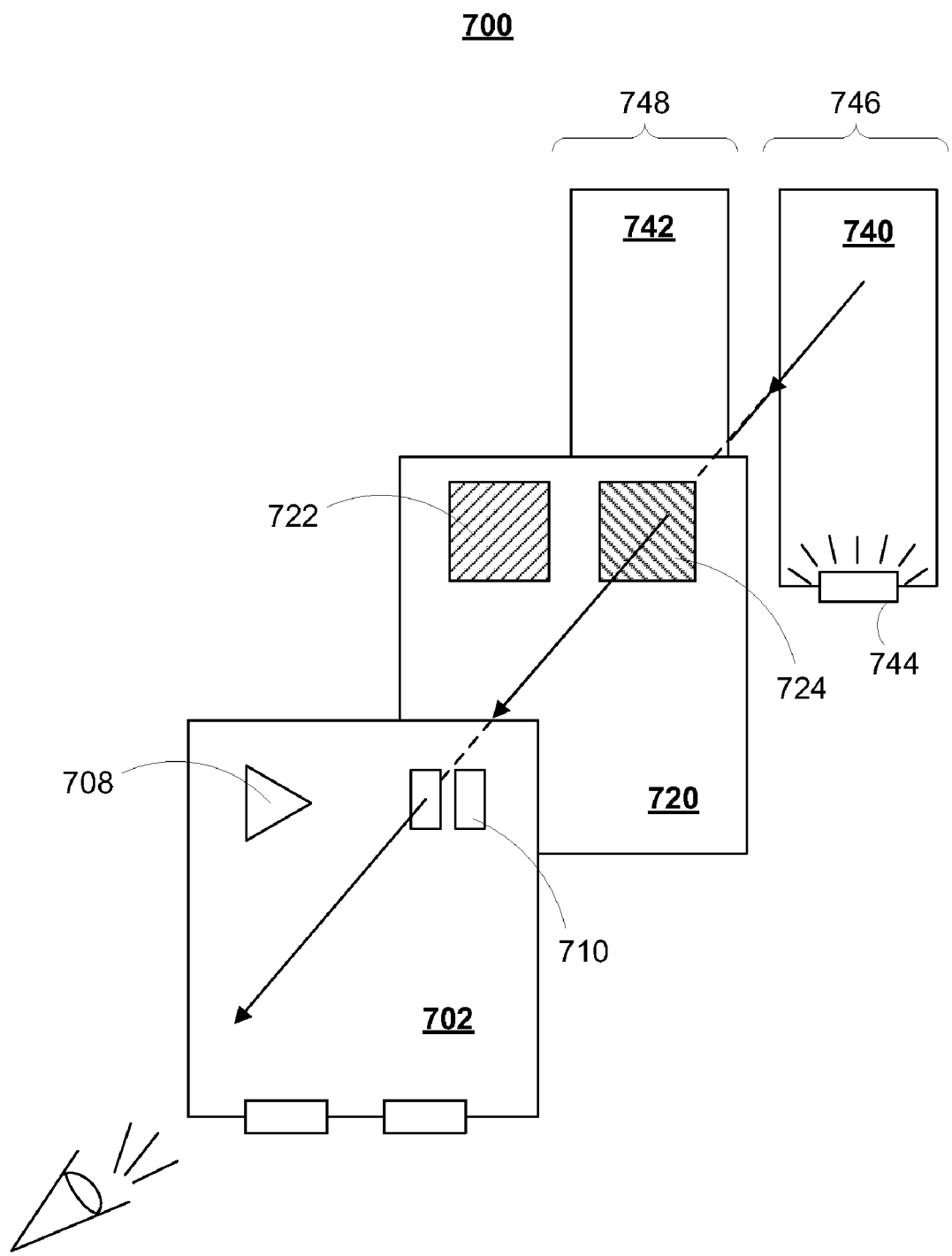
Figure 8:
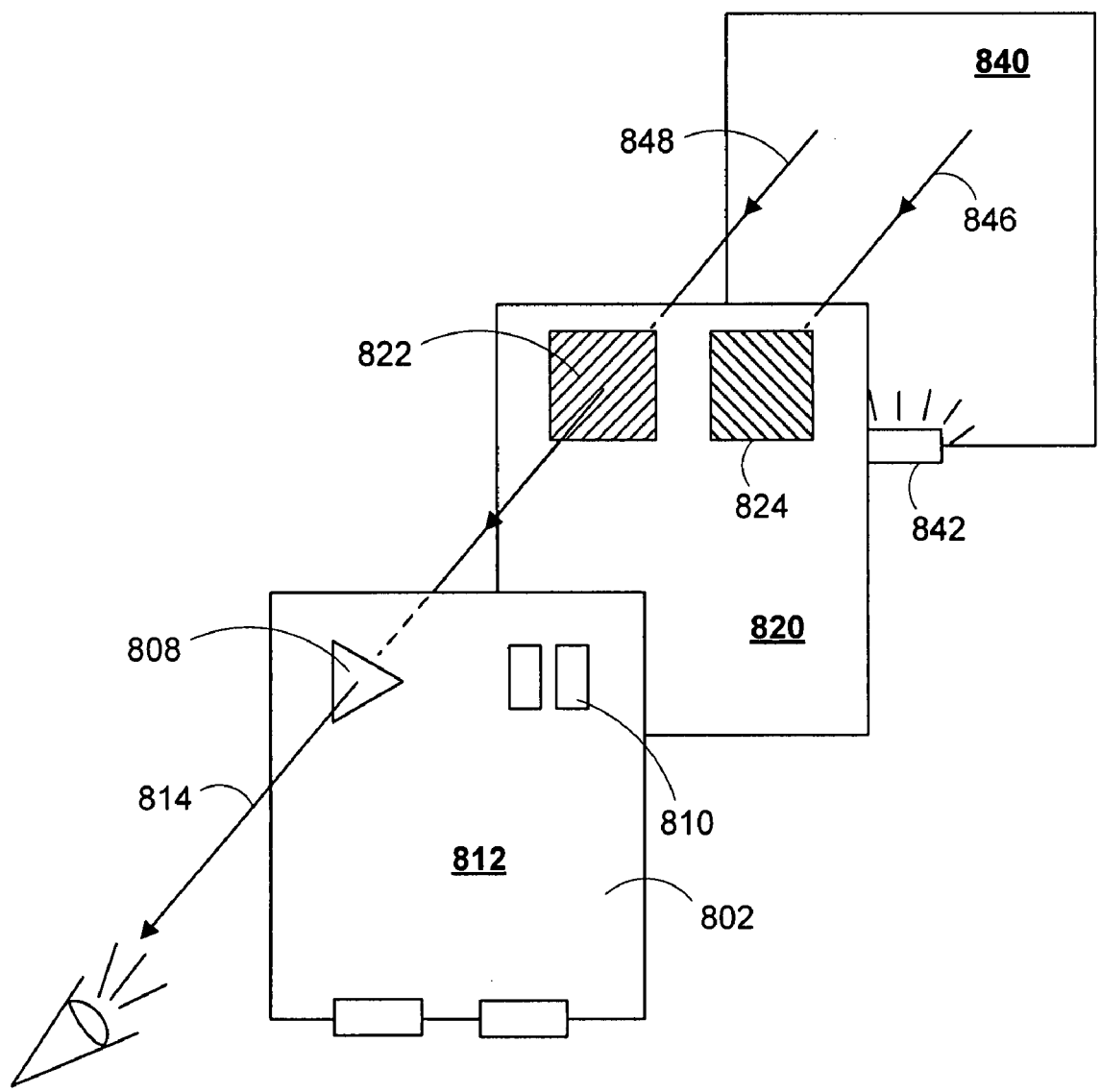
Figure 9:
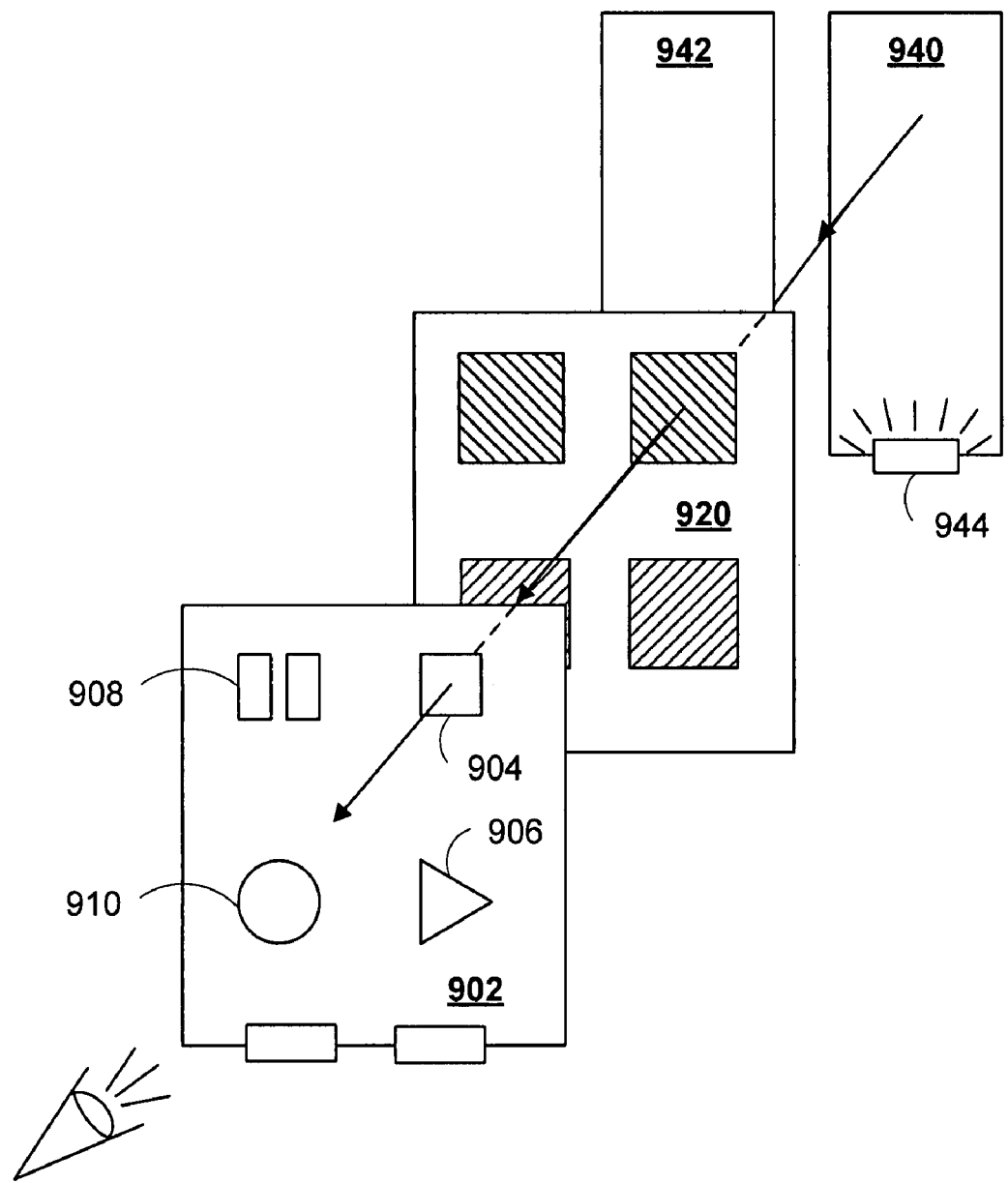
Figure 10A:
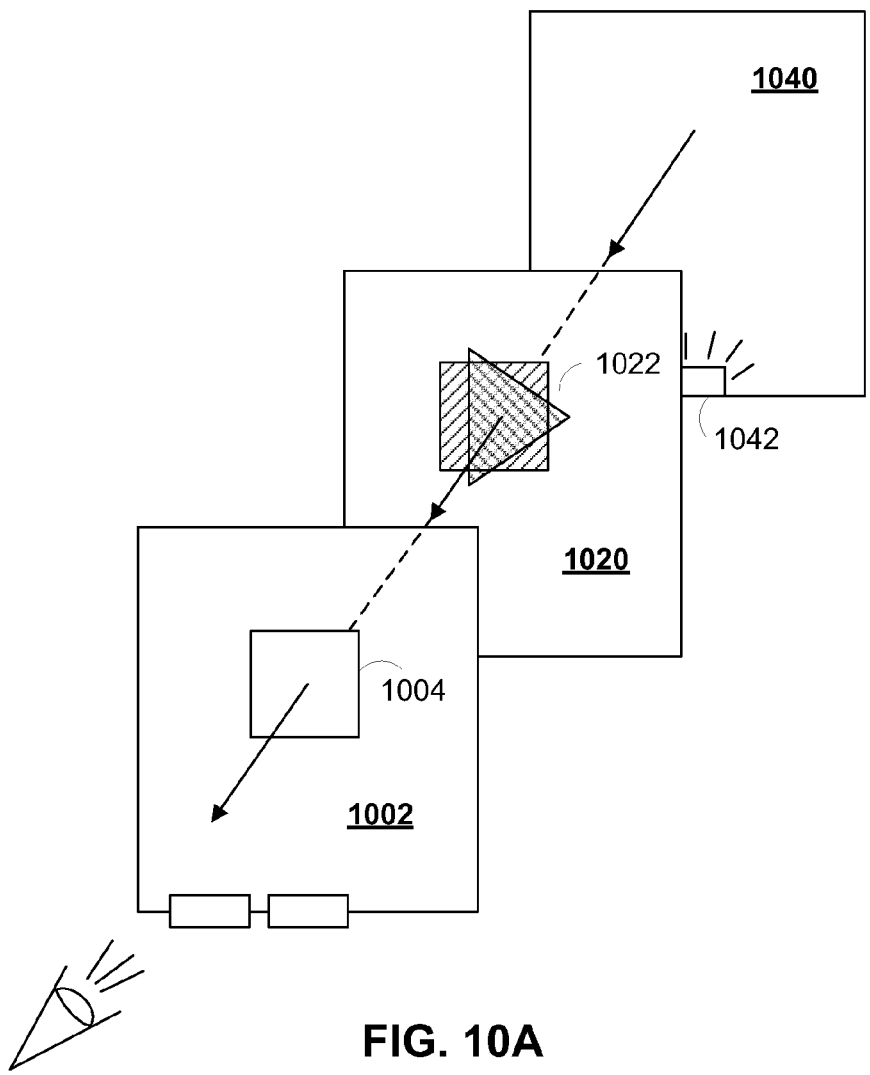

In accordance with another aspect of the present invention, multiple icons may be projected onto a display (e.g., display 124). Various embodiments of display systems with multiple icons are described below in connection with FIGS. 7-9 and 10A. Each of these embodiments are shown with the display system OFF. That is, the display and primary backlight may be OFF and the secondary backlight(s) may be ON to show how light may be passed from the secondary backlight(s) to the display. FIGS. 7-9 show multiple icons positioned side-by-side, and FIG. 10A shows multiple icons superimposed on one another. Each of the icons in any of the embodiments may be of one or more colors. Thus, color filters, which filter out certain colors or only permit certain colors to pass, may be utilized in some or all of these embodiments.

Referring first to FIG. 7, an exploded view of a portion of display system 700 is shown for projecting multiple side-by-side icons onto a display. In this embodiment, the light for each icon is provided by a separate light source. Therefore, rather than a single secondary backlight, multiple secondary backlights, such as backlights 746 and 748, can be provided to generate and guide light from their respective light sources to their respective indicators. It is understood that backlights 746 and 748 are referred to as separate secondary backlights for simplicity, but may instead be considered in combination as a single secondary backlight. As shown in FIG. 7, two icons may be projected onto the display: a "play" icon and a "pause" icon. The light for the play icon is supplied by backlight 748, and the light for the pause icon is supplied by backlight 746. The play and pause shaped indicators may be etched at locations 708 and 710 of primary layer 702, respectively, or at any other suitable location on the primary layer. Light source 744 of backlight 746 may generate light for the pause icon, and secondary layer 740 may guide this light toward pause icon region 710. Another light source (not shown) associated with backlight 748 may provide light for the play icon, and secondary layer 742 may guide this light toward play icon region 708.

In some embodiments, the light sources for secondary backlights 746 and 748 may be the same color. In other embodiments, secondary backlights 746 and 748 may provide light of different colors. For example, secondary backlight 746 may provide red light for the pause indicator, and secondary backlight 748 may provide green light for the play indicator. In these embodiments, color filters may be used to prevent light provided by one secondary backlight from providing light for an icon associated with another secondary backlight. Thus, a color filter layer with color filters for each icon may be provided between the primary backlight layer and the secondary backlight layers. For display system 700, the color filter layer may include color filter 724, placed behind pause etch 710, and color filter 722, placed behind play etch 708. Color filter 724 may be used to allow only red light (e.g., from light source 744) to pass to the pause etch, and may block green light from the pause etch. Color filter 722 may be used to prevent any light from light source 744 from reaching the play etch by, for example, filtering out red light or absorbing all but green light. It should be understood that FIG. 7 and its description above is merely illustrative. Thus, more than two icons may be provided, and each of any suitable size, shape, and color.

It may be further contemplated that color filter layer 720 in FIG. 7 may be omitted from the display system without substantially changing the look or functionality of the indicators. For example, if little or none of the light generated by light source 744, intended to light a pause icon, reaches play indicator region 708, and vice versa, then color filters 722 and 724 may not be necessary.

FIG. 8 shows another simplified embodiment of a partial display system with multiple indicators. In this embodiment, a single secondary backlight may be used to provide light for multiple side-by-side icons. Thus, device 800 can include a single secondary backlight with light source 842 and backlight layer 840. Light source 842 may provide light of different colors, and the color of the provided light may determine whether the light is passed through the play and pause etch on primary layer 802. To provide light of different colors, light source 842 may be a colored LED that may change between two or more colors by, for example, changing the direction of current flow through the LED. Thus, light source 842 may include an LED that may generate either green or red light to provide either the color associated with "play" or the color associated with "pause." Alternatively, light source 842 may include multiple, single-colored LEDs, where each LED emits a different color, and the LEDs may be selectively turned ON and OFF. Thus, a green LED may used to indicate that media is playing, while a red LED may be used to indicate that the media has been paused.

Color filter layer 820 may be included between the primary and secondary backlights to allow only the intended indicator(s) to be displayed. Otherwise, every icon would be displayed when the secondary backlight is turned ON. Color filter layer 820 may include a different type of color filter for each of the semitransparent regions on the primary backlight. Here, color filter layer 820 includes color filters 822 and 824. Color filter 822 may be used to allow only green light to project through play etch 808. Color filter 824 may be used to allow only red light to project through pause etch 810. Thus, FIG. 8 shows light source 842 generating green light, because light is shown to reach only play etch 808. Therefore, to display a play icon, green light may be supplied by the secondary backlight and projected towards both color filters 822 and 824. Of the supplied light, only light 848 transmitted toward color filter 822 associated with the play icon may be passed through color filter layer 820. Light 846 that otherwise may have reached pause etch 810 is blocked by color filter 824. Then, of the light that passes through the color filter layer, only the portion of the light that is transmitted toward play etch 808 may be passed to the display (e.g., light 814).

Although only two indicators are shown in partial display system 800, it should be understood that any suitable number of indicators may be provided using this configuration. For example, the secondary backlight may include one or more secondary light sources that may collectively provide any suitable number of colors. In addition, the color filter layer may provide any suitable number of color filters to selectively pass certain colors.

FIG. 9 shows another exploded view of a portion of display system 900 with multiple indicators, which combines the embodiments of FIGS. 7 and 8. In particular, device 900 has multiple secondary backlights, each of which can provide light for multiple indicators. As with FIG. 7, the multiple secondary backlights may also be considered a single secondary backlight with multiple parts, but are referred to as separate backlights for simplicity. As shown in FIG. 9, a total of four indicators are provided by two secondary backlight layers. Backlight layer 940 provides light to square ("stop") indicator etch 904 and play indicator etch 906 on primary layer 902. Backlight layer 942 provides light to pause indicator etch 908 and circle ("record") indicator 910. In some embodiments, four colors may be used such that each indicator is illuminated with a different color. Alternatively, two or three colors may be used. For example, light source 944 may provide either red or green light to create a red stop indicator and a green play indicator. The light source associated with layer 942 (not shown) may provide either an orange or red light to create an orange pause indicator and a red record indicator. Thus, three total colors can be used in the display system. In some embodiments, to prevent light generated from one secondary backlight to reach the indicators associated with the other secondary backlight, a second color filter layer (e.g., in addition to color filter layer 920) may be provided to absorb undesired colors.

FIG. 10A shows another exploded view of a portion of a display system for presenting multiple identifiers at substantially the same location on the display. Rather than etching the shape of the identifier onto primary backlight layer 1002, the shape of the identifier can be created by shaping color filters 1022 on color filter layer 1020. In other embodiments, color filters 1022 may be part of separate color filter layers. Semi-transparent region 1004 may be etched such that the region is large enough to allow all of the shapes to project through the display system.

Figure 10B:
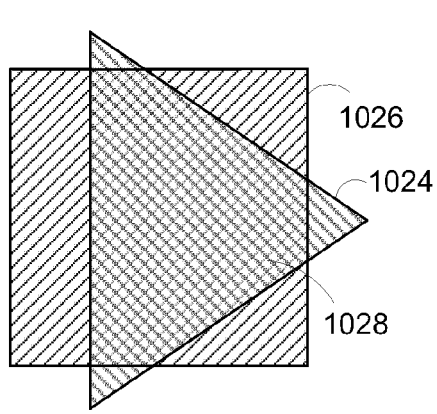
FIGS. 10B and 10C show color filter configurations in accordance with an embodiment of the present invention.

A larger view of color filters 1022 is shown in FIG. 10B. Here, color filters 1024 and 1026 may be shaped like a triangular "play" icon and a square "stop" icon, respectively. Play indicator filter 1024 and stop indicator filter 1026 may be overlaid. Play indicator filter 1024 may be tinted green, and stop indicator 1026 may be tinted red. Thus, filter 1024 may be more effective at transmitting green, and filter 1026 may be more effective at transmitting red. If green light is emitted from secondary light source 1042 of secondary backlight layer 1040, the image projected onto the display can be a substantially green play identifier. If red light is emitted from secondary light source 1042, the image projected onto the display may be a substantially red play identifier. If neither filter completely blocks the other color from being transmitted, overlapping portion 1028 may pass light regardless of the color.

Alternatively, overlapping portion 1028 may be completely removed, leaving a hole in the color filter layer, or overlapping portion 1028 may be completely transparent or translucent. Either way, the overlapping portion may pass light generated by the secondary backlight regardless of the color. The other, non-overlapping portions of the color filters, which determine the shape that is projected onto the display, may selectively pass light based on the color of the transmitted light. Thus, depending on the color of the light, a viewer may see either the play or the stop indicator on the display.

Figure 10C:
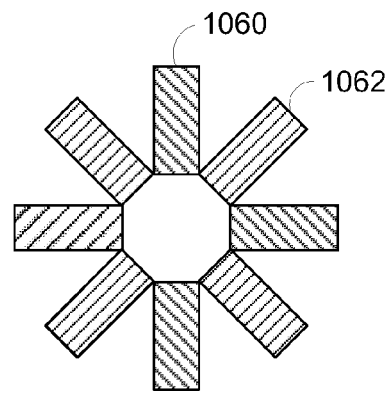

In accordance with another embodiment of the present invention, an icon projected onto a display may be dynamic. This type of icon may be used to show the progress of a system process, such as the progress of media download (e.g., the more dynamic, the closer the download is to complete). In some embodiments, a dynamic icon may be created by using an icon that alternates between different colors. FIG. 10C shows an illustrative color filter arrangement for creating such a dynamic icon. These color filters may be used in place of color filters 1022 (FIG. 10A). Eight or more color filter pieces may be used and divided evenly into two types. For example, color filters 1060 may pass orange light, and color filters 1062 may pass red light. The eight pieces can be circularly arranged such that adjacent pieces are different colors. Thus, if light source 1042 alternates between emitting orange and red light every half-second, the resulting indicator projected on the display may appear to be rotating. By varying the speed of the alternating light, the speed of the rotation may be varied.

In other embodiments, a dynamic icon may be created by turning the light source of the secondary backlight ON and OFF such that the resulting icon blinks. Then, the rate of the blink may be used as a progress indicator. In still other embodiments, the brightness of the light provided by the secondary backlight may be varied. To vary the brightness, the light source of the secondary backlight may be driven by a variable voltage source, and the intensity of the light may be adjusted by adjusting the voltage. Alternatively, the brightness may be varied by driving the light source with a pulse-width-modulation (PWM) signal and varying the duty cycle.

An icon that indicates the status of the electronic device may be provided using any of the embodiments described above in connections with FIGS. 4A-10C, and, if necessary, may vary in any number of properties, such as in color, shape, brightness, blinking pattern (e.g., steady light, slow blink, fast blinking), moving indicator speed, and location. Any of the above properties may vary in time (e.g., blinking pattern may speed up or slow down), or may maintain the same properties over time. Also, a provided icon may change properties (e.g., change from a blinking pattern to constant) at any appropriate time. Thus, it should be understood that a secondary backlight may be ON even if the backlight is not providing a steady light.

The particular properties of light provided by a secondary backlight may also be chosen to conserve power in the electronic device. In these embodiments, a secondary backlight may selectively or intermittently provide light for an icon. For example, an indicator may be displayed for predetermined time intervals, such as for half a second every five seconds. Also, the intensity of the light, and therefore the amount of power consumed, may be lowered by using, e.g., a PWM waveform.

Figure 11:
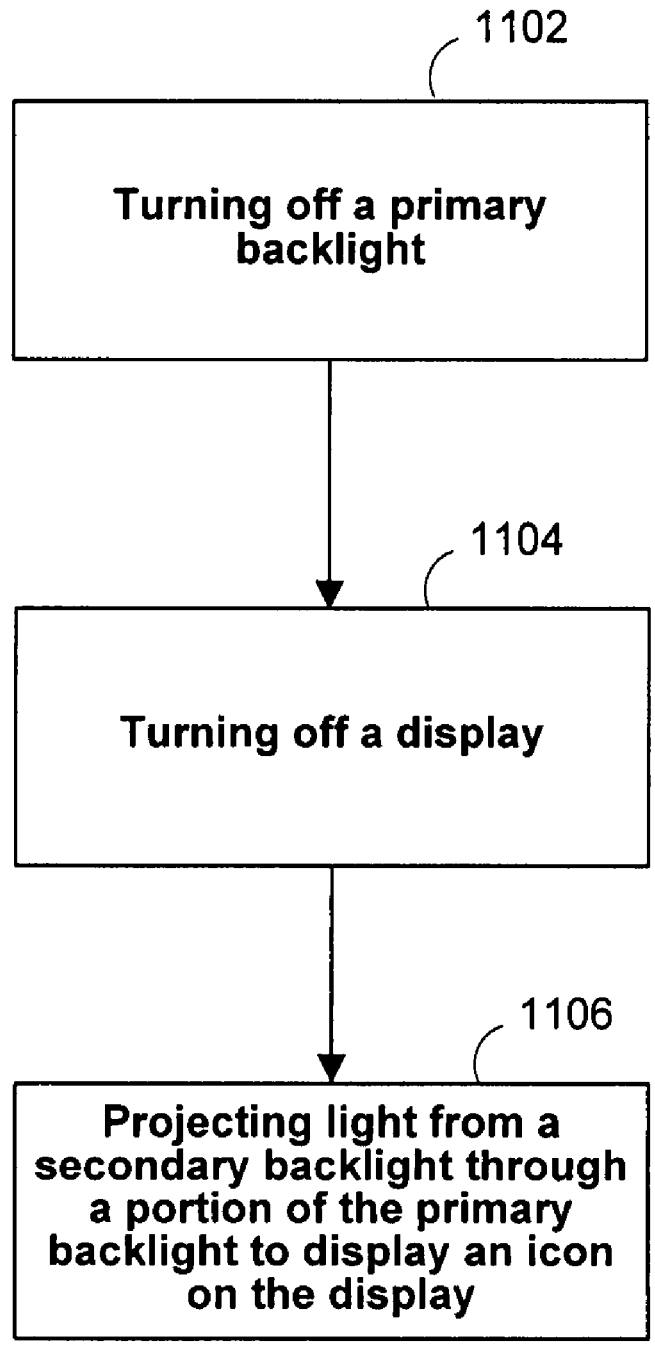
FIG. 11 shows an illustrative flow chart for changing the state of a display system from ON to OFF in accordance with an embodiment of the present invention.

FIG. 11 shows illustrative flow diagram 1100 for changing the state of a display system from ON to OFF. At step 1102, a primary backlight (e.g., primary backlight 306 in FIG. 3) that illuminates a display (e.g., display 304 in FIG. 3) may be turned OFF. The primary backlight may be turned OFF after a period of monitored user inactivity. The idle time necessary for the primary backlight to be turned OFF may be programmed by the user or may be hard-coded or hard-wired to a predetermined length of time. Alternatively, the primary backlight may be turned OFF in response to a user indication, such as by pressing a button on the electronic device (e.g., using user interface 108). In addition, a user may program the electronic device such that the primary backlight is always OFF. In this case, step 1102 may be skipped.

The display itself may be turned OFF at step 1104 in FIG. 11. The display may be turned OFF in response to the primary backlight turning OFF, or the display may be turned OFF at substantially the same time as the primary backlight. In other cases, the primary backlight may be turned OFF after a period of monitored user inactivity or in response to a user indication.

At step 1106 in FIG. 11, a secondary backlight (e.g., secondary backlight 308 in FIG. 3) may be turned on to project a light through the primary backlight and onto the display. The light may be projected through a portion of the primary backlight, and the portion may be of any suitable size and shape. Thus, an icon of that size and shape may be displayed on the display.

The icon may be displayed at step 1106 at any suitable time after step 1104. The icon may be displayed substantially immediately following step 1104 to indicate the status of the device. For example, if the electronic device is playing music at the time the display is turned OFF, the secondary backlight may turn ON to display a "play" icon to the user substantially immediately following step 1104. Alternatively, secondary backlight may be turned ON at some point substantially after step 1104 to indicate a change in the status of the device. For example, if media is downloading to the electronic device (e.g., into storage device 104) when the display is turned OFF, secondary backlight may turn ON after the download is complete to notify the user. The secondary backlight may also turn ON to indicate a change in device conditions, such as to indicate a low battery.

It should be understood that FIG. 11 is merely illustrative. In fact, steps 1102, 1104, and 1106 may be performed in any order or at substantially the same time. Furthermore, any of the shown steps may be omitted or modified, and any additional steps may be performed without leaving the scope of the invention. For example, in some embodiments, one or both of the primary backlight and the display may remain ON when the secondary backlight is ON. This may be used to provide information on the display other than media provided by the display. For example, the secondary backlight may be used to tint an area of the display a different color in order to highlight or emphasize that area of the screen.

Figure 12:
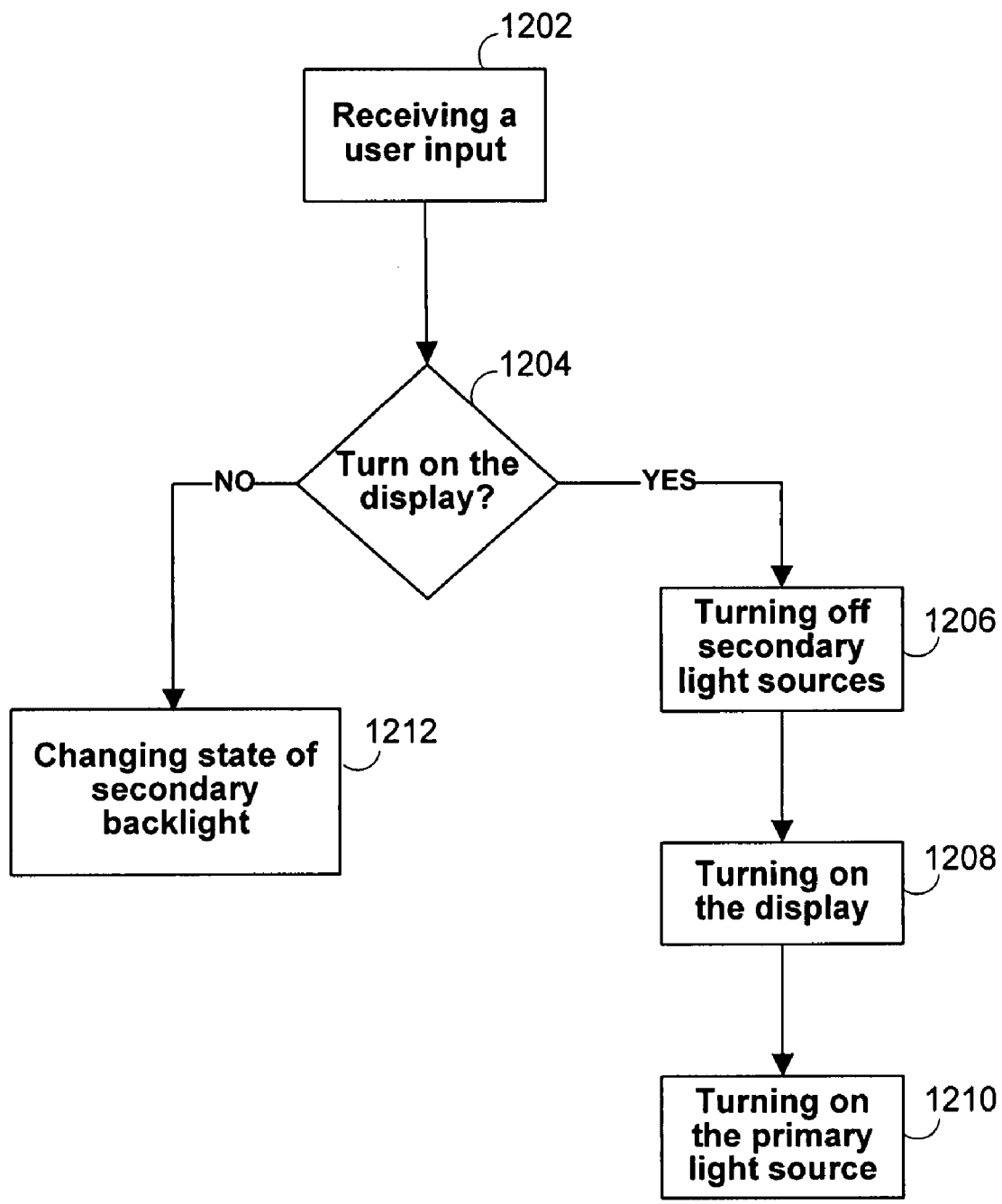
FIG. 12 shows an illustrative flow chart for changing the state of a display system from OFF to ON in accordance with an embodiment of the present invention.

FIG. 12 shows illustrative flow diagram 1200 for responding to a user input when a display (e.g., display 304 of FIG. 3) is OFF. At step 1202, a user input is received. The user input may be a push of a button on the electronic device or any other suitable user input (e.g., rotation of the device). In response to the user input, a determination is made as to whether to turn the display ON at step 1204. Determination 1204 may be based on user preferences, particular device conditions, such as the remaining battery life of the device, or device operating conditions, such as the length of time the display has been OFF.

If the display is to be turned ON, the secondary backlight, if ON, may be turned OFF at step 1206. The display may be turned ON at step 1208, and the content provided by the display may depend on the particular user input received at step 1202. To illuminate the display, a primary backlight may additionally be turned ON at step 1210. Alternatively, depending on user preference, remaining battery life, or any other suitable reason, the primary backlight may remain OFF.

If the display is to remain OFF following the user input, the state of the secondary backlight may change at step 1212 if the status of the electronic device changes. For example, the status of the electronic device may change in response to receiving the user input at step 1202. In response to the user input or in response to a change in device status caused by the user input, the secondary backlight may turn ON, turn OFF, change color, or change the properties of the light it provides in some other way. Each possible device status may be associated with a status indicator with particular properties. A media player, for instance, may take on "play," "pause," "stop," and "record" states, and each state may be associated with an indicator of different color, brightness, etc. Thus, if a user input is received at step 1202 that changes the electronic device from one state to another, the properties of the light provided by the secondary backlight may change accordingly. In particular, the electronic device may determine the status of the device and may determine what properties of light to provide, if any, based on the determined status. The particular properties of an icon for each device status may be programmed by the user. For example, a user may set preferences for the appearance of the icon into a menu provided by the electronic device (e.g., using user interface 108 of FIG. 1). Alternatively, the particular properties of an icon may be hard-coded or hard-wired into the device (e.g., a "play" icon may be hard-wired to be green), or the properties may be determined by a combination of user-defined preferences and hard-wired or hard-coded states.

It should be understood that FIG. 12 is merely illustrative. Any of the steps in FIG. 12 may be omitted, modified, or rearranged, and any additional steps may be performed without leaving the scope of the invention. Furthermore, flow diagram 1200 may be modified to include multiple secondary backlights, if applicable.

Figure 13:
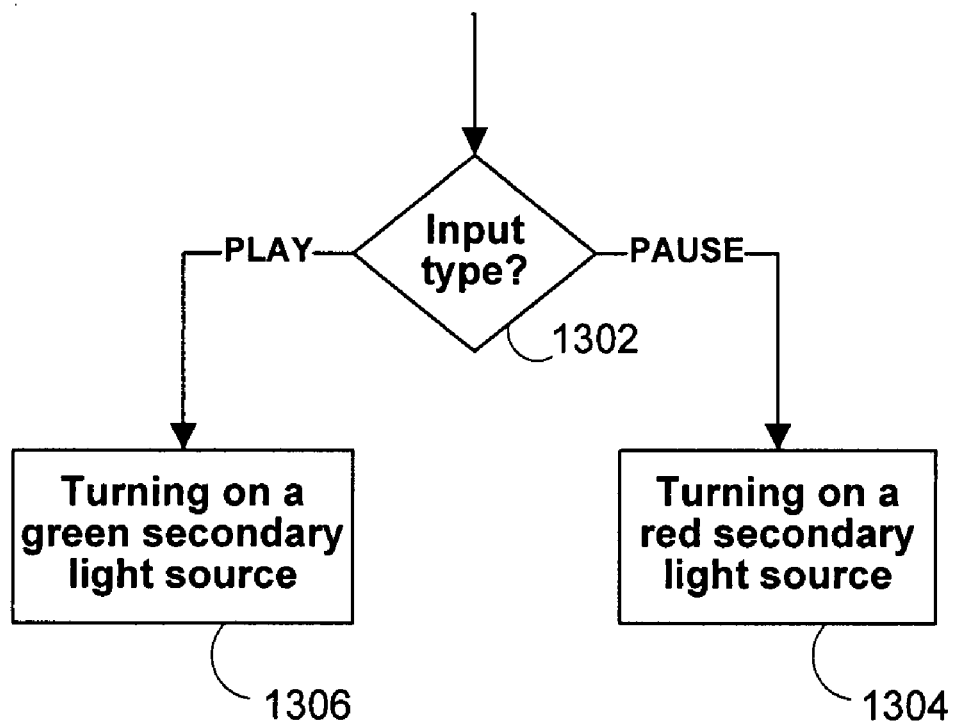
FIG. 13 shows an example of how one of the steps of FIG. 12 can be implemented in accordance with an embodiment of the present invention.

FIG. 13 shows exemplary steps that can be implemented in step 1212. At step 1302, the type of user input received at step 1202 is determined. The secondary backlight may provide a green light or a red light depending on the determination. If a "pause" command is received at step 1202, the secondary backlight may turn on a red light at step 1304. All other secondary backlight sources may be turned OFF. The red light may project a red pause icon onto the display (such as that shown in FIG. 7).

If the user input received at step 1202 in FIG. 13 is a "play" command, the secondary backlight may turn on a green light at step 1306. All other secondary backlight sources may be turned OFF. The green light may project a green play icon onto the display, (such as indicator 206 shown on display screen 202 in FIG. 2B). The icon may be projected through a portion of the primary backlight.

Figure 14:
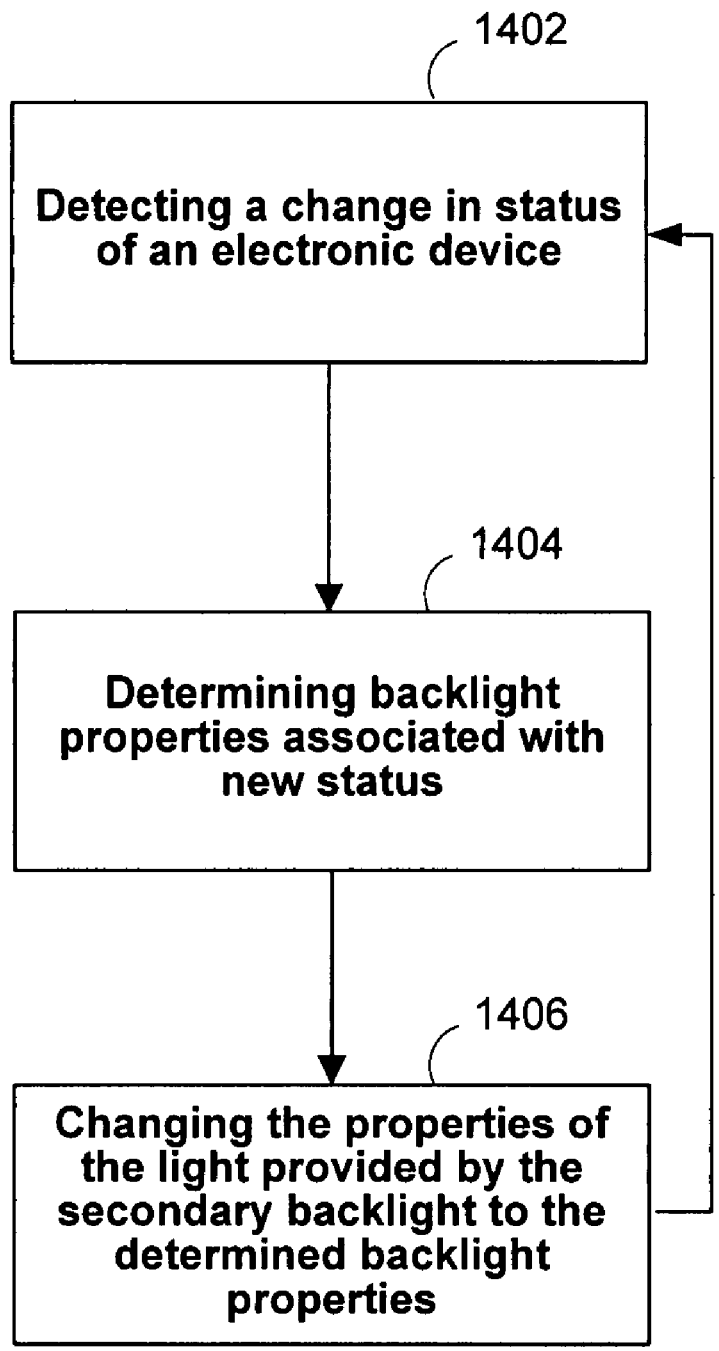
FIG. 14 shows an illustrative flow chart for changing the properties of light provided by a secondary backlight system in accordance with an embodiment of the present invention.

FIG. 14 shows illustrative flow diagram 1400 for changing the properties of light provided by a secondary backlight when the secondary backlight may be ON. Flow diagram 1400 may be used, for example, as part of step 1106 in flow diagram 1100 (FIG. 11) or in conjunction with step 1212 in flow diagram 1200 (FIG. 12). At step 1402, the electronic device may wait for a change in status. For example, the electronic device may detect a state change from "play" to "stop," or the electronic device may detect that a download has completed. Alternatively, the electronic device may detect a change in device conditions or in other device operating conditions. To detect a change, interrupt circuitry may be implemented in the electronic device, or the electronic device may periodically poll (e.g., every 5 ms) for the current state of the device.

After a change in the status has been detected, the electronic device may determine properties associated with the new state of the device at step 1404. As discussed above, some operating states of a device can be associated with display identifiers of different shape, color, or other properties, and these properties may be predefined by a user, hard-wired or hard-coded, or set according to a combination of user preferences and default device settings. Light of these particular properties may be provided by a secondary backlight. Thus, at step 1404, the particular properties of light that is to be provided by a secondary backlight is determined.

After determining the light properties associated with the new state of the electronic device, at step 1406, the light provided by the secondary backlight may change to reflect the determined properties. For example, the secondary backlight may change from providing a green light to providing a red light if the status of the devices changes from "play" to "pause." In some cases, certain states may not be associated with any identifier. For example, an electronic device may not display an indicator when in a "pause" state. Therefore, the secondary backlight may be turned OFF at step 1406 if the electronic device changes from a "play" to a "pause" state. Afterwards, the electronic device may return to step 1402 to detect when another status change occurs. Thus, if the electronic device returns to a "play" state, the secondary backlight may be turned ON again.

It should be understood that FIG. 14 is merely illustrative. Any of the steps in FIG. 14 may be omitted, modified, or rearranged, and any additional steps may be performed without leaving the scope of the invention. Furthermore, flow diagram 1400 may be modified to include multiple secondary backlights, if applicable.

Thus, the foregoing describes system and methods for providing one or more icons on a display regardless of whether the display is ON. Those skilled in the art will appreciate that the invention can be practiced by other than the described embodiments, which are presented for the purpose of illustration rather than of limitation.

What is claimed is:

1. A method for presenting information on a display of an electronic device comprising primary and secondary backlight systems, the method comprising:
   selecting at least one region of the primary backlight system that defines at least one informational indicator; and
   projecting light from the secondary backlight system through the at least one selected region of the primary backlight system, wherein the projected light forms the at least one informational indicator on the display.

2. The method of claim 1, wherein the display is turned OFF when the at least one informational indicator is formed on the display.

3. The method of claim 1, wherein the primary backlight system is turned OFF when the at least one informational indicator is formed on the display.

4. The method of claim 1, wherein the display and the primary backlight system are turned OFF when the at least one informational indicator is formed on the display.

5. The method of claim 1, wherein a shape of the at least one informational indicator is defined by the at least one region of the primary backlight system.

6. The method of claim 1, further comprising:
   filtering the light projected from the secondary backlight system.

7. The method of claim 1, wherein projecting light from the secondary backlight system comprises:
   selectively providing light from either a first light source or a second light source of the secondary backlight system.

8. The method of claim 1, further comprising:
   determining a status of the electronic device; and
   displaying a particular informational indicator based on the determined status.

9. The method of claim 1, further comprising:
   receiving a user input; and
   displaying a particular informational indicator based on the received user input.

10. The method of claim 1, further comprising:
    selectively guiding the projected light through the at least one region of the primary backlight system.

11. The method of claim 1, wherein the projecting light comprises selectively projecting light from a subset of light sources of the secondary backlight system through the at least one region.

12. The method of claim 1, further comprising:
    blocking the projected light from being projected through another region of the primary backlight system.

13. The method of claim 1, further comprising:
    selecting the at least one region from a plurality of regions of the primary backlight system.

14. A method for presenting information on a display of an electronic device comprising primary and secondary backlight systems, the method comprising:
    turning OFF the display and the primary backlight system;
    determining a status of the electronic device that is independent of the status of the primary backlight system;
    selecting a region of the primary backlight system based on the determined status, wherein the region defines at least one informational indicator; and
    selectively turning ON the secondary backlight system to project light through the selected region based on the determined status to display the at least one informational indicator on the display while the display and primary backlight system are turned OFF.

15. The method of claim 14, wherein the determined status comprises at least one of a playback status of media on the electronic device and a download status of media to the electronic device.

16. A method of presenting one of a plurality of informational indicators on a display of an electronic device comprising primary and secondary backlight systems, wherein the secondary backlight system comprises a plurality of light sources, the method comprising:
    turning OFF the display;
    selecting a region of the primary backlight system that defines the one of the plurality of informational indicators; and
    selectively projecting light from a subset of the plurality of light sources through the selected region of the primary backlight system to selectively display the one of the plurality of informational indicators on the display while the display is turned OFF.

17. The method of claim 16, wherein the primary backlight system comprises a plurality of regions for light to project through from the secondary backlight system, and wherein each informational indicator is associated with one of the plurality of regions.

18. The method of claim 17, the method further comprising:
    filtering the light provided by the subset of the plurality of light sources to allow light through one of the plurality of regions.

19. The method of claim 16, wherein each informational indicator is associated with a set of properties, the method further comprising:
    determining the set of properties associated with an informational indicator that is to be displayed; and
    selectively projecting light from at least one of the plurality of light sources that can provide light according to the set of properties.

20. The method of claim 19, wherein the set of properties includes at least one of color, intensity, blinking pattern, blinking speed, and location.

21. The method of claim 16, wherein light is selectively provided from multiple light sources to create a motion icon.

22. The method of claim 16, further comprising:
    turning ON and OFF a selected light source of the plurality of light sources repeatedly at a predetermined rate.

23. The method of claim 16, further comprising:
    adjusting an intensity of a selected light source of the plurality of light sources.

24. The method of claim 16, further comprising:
    filtering light provided by the subset of the plurality of light sources to shape the displayed informational indicator.

25. An electronic device, comprising:
    a display;
    a primary backlight system comprising a plurality of semitransparent regions, wherein a first semitransparent region has a first shape that defines an icon, the primary backlight system operative to illuminate a substantially full portion of the display; and
    a secondary backlight system operative to selectively project light through the first semitransparent region selected from the plurality of semitransparent regions onto the display while the display and the primary backlight system are turned OFF, wherein the projected light forms the icon of the first shape on the display.

26. The electronic device of claim 25, wherein the primary backlight system comprises one or more light sources for generating light to illuminate the substantially full portion of the display.

27. The electronic device of claim 25, wherein the primary backlight system comprises a light pipe for transporting light evenly across the substantially full portion of the display.

28. The electronic device of claim 25, wherein the primary backlight system comprises a reflective layer for directing light toward the display.

29. The electronic device of claim 25, wherein the secondary backlight system comprises one or more light sources for lighting a portion of the display.

30. The electronic device of claim 29, wherein the one or more light sources are in a single device.

31. The electronic device of claim 25, wherein the secondary backlight system comprises a light pipe for transporting light to at least a location near the semitransparent region.

32. The electronic device of claim 25, wherein the secondary backlight system comprises a reflective layer for directing light through the at least one semitransparent region.

33. The electronic device of claim 25, further comprising a filtering system, wherein the filtering system allows light of certain properties to reach predetermined areas of the display.

34. An electronic device, comprising:
a display;
a primary backlight system including at least one primary light source, a primary light pipe having a first and second side, and a primary reflective layer comprising at least one semitransparent region that has a first shape, the primary reflective layer having a third and fourth side, wherein the second side of the primary light pipe is mated to the third side of the primary reflective layer, and wherein the primary light source is operative to project light to at least the first side of the primary light pipe; and
a secondary backlight system including at least one secondary light source, at least one secondary light pipe having fifth and sixth sides, and at least one secondary reflective layer having seventh and eight sides, wherein the sixth side of the at least one secondary light pipe is mated to the seventh side of the at least one secondary reflective layer, and wherein the at least one secondary light source is operative to selectively project light to at least the fifth side of the at least one secondary light pipe, and the fifth side faces the fourth side of the primary reflective layer, and wherein the light projected by the at least one secondary light source projects through the at least one semitransparent region to form an informational indicator of the first shape on the display while the display and the primary backlight system are turned OFF.

35. The electronic device of claim 34, wherein each of the at least one secondary light source provides light though a subset of the at least one semitransparent region.

36. The electronic device of claim 34, further comprising a filtering system mated to the fourth and fifth sides.

37. The electronic device of claim 36, wherein the filtering system is operative to allow light projected from the secondary backlight system to reach one of the at least one semitransparent region.

38. The electronic device of claim 36, wherein the filtering system comprises a different filter associated with each of the at least one semitransparent region.

39. The electronic device of claim 36, wherein the filtering system comprises color filters.

40. The electronic device of claim 34, wherein the secondary light source is positioned near a perimeter of the secondary light pipe.

41. The electronic device of claim 34, wherein the secondary light source is positioned near the semitransparent region.

* * * * *